(12) United States Patent
Liu et al.

(10) Patent No.: US 11,869,252 B2
(45) Date of Patent: Jan. 9, 2024

(54) METHOD AND APPARATUS USED FOR EXTRACTING FEATURE POINT OF ENVIRONMENTAL TARGET

(71) Applicant: GREAT WALL MOTOR COMPANY LIMITED, Hebei (CN)

(72) Inventors: Hongliang Liu, Hebei (CN); Jianyong Ge, Hebei (CN); Longbao Zhen, Hebei (CN); Rutao Han, Hebei (CN); Wei Li, Hebei (CN); Junpeng Zhao, Hebei (CN); Ronglin Zeng, Hebei (CN); Chaokai Tian, Hebei (CN); Weifeng Deng, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 471 days.

(21) Appl. No.: 17/281,560

(22) PCT Filed: Sep. 27, 2019

(86) PCT No.: PCT/CN2019/108399
§ 371 (c)(1),
(2) Date: Mar. 30, 2021

(87) PCT Pub. No.: WO2020/063813
PCT Pub. Date: Apr. 2, 2020

(65) Prior Publication Data
US 2021/0365695 A1    Nov. 25, 2021

(30) Foreign Application Priority Data
Sep. 30, 2018   (CN) .......................... 201811154061.8

(51) Int. Cl.
*G06V 20/58*    (2022.01)
*G06V 20/56*    (2022.01)
*G08G 1/16*     (2006.01)

(52) U.S. Cl.
CPC ............ *G06V 20/588* (2022.01); *G06V 20/58* (2022.01); *G08G 1/166* (2013.01)

(58) Field of Classification Search
CPC ....... G06V 20/588; G06V 20/58; G08G 1/166
See application file for complete search history.

(56) References Cited

U.S. PATENT DOCUMENTS

| 2017/0247029 A1 | 8/2017 | Watanabe |
| 2017/0274898 A1 | 9/2017 | Nakamura et al. |

(Continued)

FOREIGN PATENT DOCUMENTS

| CN | 102254318 A | 11/2011 |
| CN | 103065151 A | 4/2013 |

(Continued)

OTHER PUBLICATIONS

Communication Pursuant to Article 94(3) EPC from European application No. 19865835.3 dated Nov. 8, 2021 (7 pages).

(Continued)

*Primary Examiner* — Mathew Franklin Gordon
(74) *Attorney, Agent, or Firm* — Calfee, Halter & Griswold LLP

(57) ABSTRACT

A method and apparatus used for extracting a feature point of an environmental target, which relate to the field of vehicles. The method comprises: acquiring the position of each corner point of an environmental target; and determining a feature point of the environmental target according to the position of each corner point of the environmental target. Thus, the problem wherein target identification is not precise may be solved, which is particularly suitable for the identification of a large target.

20 Claims, 6 Drawing Sheets

(56) References Cited

U.S. PATENT DOCUMENTS

2018/0053330 A1 2/2018 Lee
2018/0150082 A1 5/2018 Jang

FOREIGN PATENT DOCUMENTS

| | | |
|---|---|---|
| CN | 105956527 A | 9/2016 |
| CN | 106548486 A | 3/2017 |
| CN | 106697042 A | 5/2017 |
| CN | 107895375 A | 4/2018 |
| CN | 108280840 A | 7/2018 |
| CN | 108286976 A | 7/2018 |
| CN | 111563474 A | 8/2020 |
| JP | 2017151764 A | 8/2017 |
| KR | 101227569 | 1/2013 |
| KR | 20140125596 A | 10/2014 |
| WO | 2016031036 A1 | 3/2016 |

OTHER PUBLICATIONS

Zhi, Wang Xiangjun Wang Yan Li. "Fast Target Recognition and Tracking Method Based on Characteristic Corner [J]." Acta Optica Sinica 2 (2007) with English translation of the abstract.

"Research on the Registration Method of Natural Feature Points in Augmented Environment" by Xiangyang Li with an English Abstract.

T. Nakamura, S. Haviland, D. Bershadsky, D. Magree and E. N. Johnson, "Vision-based closed-loop tracking using micro air vehicles," 2016 IEEE Aerospace Conference, Big Sky, MT, USA, 2016, pp. 1-12.

English Translation of International Search Report and Written Opinion from PCT/CN2019/108399 dated Dec. 27, 2019 (2 pages).

METHOD AND APPARATUS USED FOR EXTRACTING FEATURE POINT OF ENVIRONMENTAL TARGET

CROSS-REFERENCE TO RELATED APPLICATIONS

This application is the National Stage of International Application No. PCT/CN2019/108399, filed on Sep. 27, 2019, which claims priority to Chinese Patent Application No. 201811154061.8 filed on Sep. 30, 2018, which are incorporated herein by reference in their entireties.

FIELD OF THE INVENTION

The present invention relates to the field of vehicles, and in particular, to a method and apparatus for extracting feature point of environmental target.

BACKGROUND OF THE INVENTION

During traveling of an autonomous vehicle, it needs to acquire information of surrounding environmental targets by using sensors installed on a vehicle body, and perform area determination on the targets in conjunction with lane line information of the surrounding environment to further obtain area attributes of the targets. Targets in different areas may be used for longitudinal control and a lane change decision, and the lane line information may be used to provide traveling path information for the vehicle to implement lateral control for lane change and lane keeping.

In the road environment, due to the presence of large environmental targets (such as large trucks) that have very large lengths and widths, such a target cannot be represented by attributes of a central point of the target, which will cause poor lateral and longitudinal control effects of the vehicle, and in serious circumstances, will cause a traffic accident. Thus, there is a need to more comprehensively extract concern information of obstacles, remove some irrelevant target attributes, simplify the difficulty of target selection by a decision-making system, and make the entire system control more accurate and safer.

SUMMARY OF THE INVENTION

In view of this, an objective of the present invention aims is to propose a method for extracting feature point of environmental target, to at least solve the problem of extraction of feature point of an environmental target.

To achieve the above objective, a technical solution of the present invention is implemented as follows.

A method for extracting feature point of environmental target includes: acquiring a position of each corner point of the environmental target; and determining one or more feature points of the environmental target according to the position of each corner point of the environmental target.

Further, one or more feature points of the environmental target comprise feature point of a fixed area and/or a feature point of a follow-up area; the feature point of the fixed area comprises one or more of: a laterally closest point of the fixed area, which is a point, being laterally closest to a reference line of a traveling coordinate system $X_F O_F Y_F$, on the environmental target; a laterally farthest point of the fixed area, which is a point, being laterally farthest from the reference line, on the environmental target; a longitudinally closest point of the fixed area, which is a point, being longitudinally closest to a coordinate origin $O_F$ of the traveling coordinate system $X_F O_F Y_F$, on the environmental target; a 3.75 feature point of the fixed area, which is a point, being longitudinally closest to the coordinate origin $O_F$, of intersection points between the environmental target and lane lines on both sides of a lane where a present vehicle is located; and a 2.8 feature point of the fixed area, which is a point, being longitudinally closest to the coordinate origin $O_F$, of intersection points between the environmental target and two virtual lines in the lane where the present vehicle is located, wherein the two virtual lines are parallel to the lane lines on both sides of the lane where the present vehicle is located, and are spaced from one of the lane lines on both sides by a predetermined lateral distance, respectively; the follow-up area is located in front of the present vehicle in a traveling direction and is parallel to a road direction and has a predetermined width, and the feature point of the follow-up area refers to a point longitudinally closest to the coordinate origin $O_F$, of intersection points between the environmental target and the follow-up area; and wherein in the traveling coordinate system $X_F O_F Y_F$, a sideline of a road where the present vehicle is located is used as the reference line, the coordinate origin $O_F$ is a point on the reference line at the shortest distance to a feature point of the present vehicle, a lateral axis $X_F$ is parallel to a guide line direction of the road, and a longitudinal axis $Y_F$ and the guide line direction of the road follow a left-hand or right-hand rule.

Further, determining the one or more feature points of the environmental target according to the position of each corner point of the environmental target comprises: selecting the laterally closest point of the fixed area, the laterally farthest point of the fixed area, and the longitudinally closest point of the fixed area from the corner points of the environmental target; calculating intersection points respectively between each line segment formed by every two adjacent corner points of the environmental target and the lane lines on both sides of the lane where the present vehicle is located, and using a point, being longitudinally closest to the coordinate origin $O_F$, of the intersection points as the 3.75 feature point of the fixed area; calculating intersection points respectively between each line segment formed by connecting every two adjacent corner points of the environmental target and the two virtual lines, and using a point, being longitudinally closest to the coordinate origin $O_F$, of the intersection points as the 2.8 feature point of the fixed area; and calculating intersection points respectively between each line segment formed by connecting every two adjacent corner points of the environmental target and the follow-up area, and using a point, being longitudinally closest to the coordinate origin $O_F$, of the intersection points as the feature point of the follow-up area.

The method further comprises: acquiring coordinates of each feature point of the environmental target in the traveling coordinate system.

Further, coordinates of any feature point of the environmental target in the traveling coordinate system is determined according to the following steps: determining a shortest distance from the reference line to the any feature point, and a point, corresponding to the shortest distance, on the reference line; using a numerical value of the shortest distance as a numerical value of an ordinate of the any feature point in the traveling coordinate system; determining a longitudinal arc length between the point on the reference line at the shortest distance to the any feature point and the coordinate origin $O_F$; and using a numerical value of the longitudinal arc length as a numerical value of an abscissa of the any feature point in the traveling coordinate system, wherein whether the ordinate and the abscissa of the any feature point are positive or negative is determined according to the position of the feature point relative to the coordinate origin $O_F$ in the traveling coordinate system.

Further, an extension line of a center line of the follow-up area passes through a front-end center point of the present vehicle; a length of the follow-up area ranges from 150 m to 250 m; and/or a width of the follow-up area ranges from 2.2 m to 3.4 m.

Further, the predetermined lateral distance ranges from 0.445 m to 0.505 m.

Further, acquiring the position of each corner point of the environmental target comprises: acquiring position of a rear-end center point of the environmental target, an included angle between a center line of the environmental target and a lateral or longitudinal axis of the present vehicle, a length of the environmental target, and a width of the environmental target; and calculating the position of each corner point of the environmental target by using the position of the rear-end center point, the included angle, the length of the environmental target, and the width of the environmental target.

Compared with the prior art, the method for extracting the feature point of the environmental target of the present invention has the following advantages:

by selecting the feature point, the method can solve the problem of inaccurate target recognition, and is especially suitable for recognition of large targets (such as trucks). By accurately extracting feature point of the environmental target, which is more concerned by the decision-making system, the decision-making system's demand for information of the target is reduced, and computation by the decision-making system is simplified. The decision-making system performs lateral and longitudinal control according to the extracted target feature point, so that a control strategy is easier to implement, and control accuracy and control effect are ideal.

Another objective of the present invention is to propose an apparatus for extracting feature point of environmental target, the apparatus including a memory and a processor, wherein the memory stores instructions which are configured to enable the processor to execute the above-mentioned method for extracting the feature point of the environmental target.

The apparatus for extracting the feature point of the environmental target has the same advantages as the above-mentioned method for extracting the feature point of the environmental target over the prior art, which will not be described in detail herein.

Yet another objective of the present invention is to propose a machine-readable storage medium that stores instructions which are configured to enable a machine to execute the above-mentioned method for extracting feature point of environmental target.

Other features and advantages of embodiments of the present invention will be described in detail in the subsequent section of detailed description of the embodiments.

BRIEF DESCRIPTION OF DRAWINGS

The accompanying drawings are intended to provide further understanding of the embodiments of the present invention and form a part of the specification, and are used, together with the following implementations, for explaining the embodiments of the present invention, but do not limit the embodiments of the present invention. In the drawings.

| | |
|---|---|
| 910 | Memory |
| 920 | Processor |

DETAILED DESCRIPTION OF THE EMBODIMENTS

Specific implementations of the embodiments of the present invention will be described in detail below in conjunction with the accompanying drawings. It should be understood that the specific implementations described here are only used for illustrating and explaining the embodiments of the present invention, instead of limiting the embodiments of the present invention.

Figure 1:
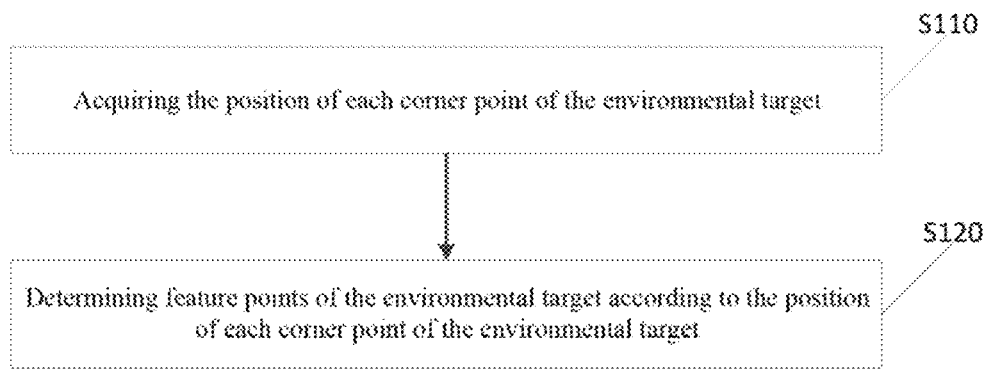
FIG. 1 shows a flow diagram of a method for extracting feature point of environmental target according to an embodiment of the present invention.

FIG. 1 shows a flow diagram of a method for extracting feature point of environmental target according to an embodiment of the present invention. As shown in FIG. 1, an embodiment of the present invention provides a method for extracting feature point of environmental target. The method may be applied to any vehicle, such as an autonomous vehicle. The method may include: step S110, acquiring a position of each corner point of the environmental target; and step S120, determining one or more feature points of the environmental target according to the position of each corner point of the environmental target. The "environmental target" may refer to any moving or stationary object around the vehicle, such as a vehicle, a human and a building. The embodiment of the present invention is described by taking an "environmental target" which is a vehicle as an example.

Figure 2:
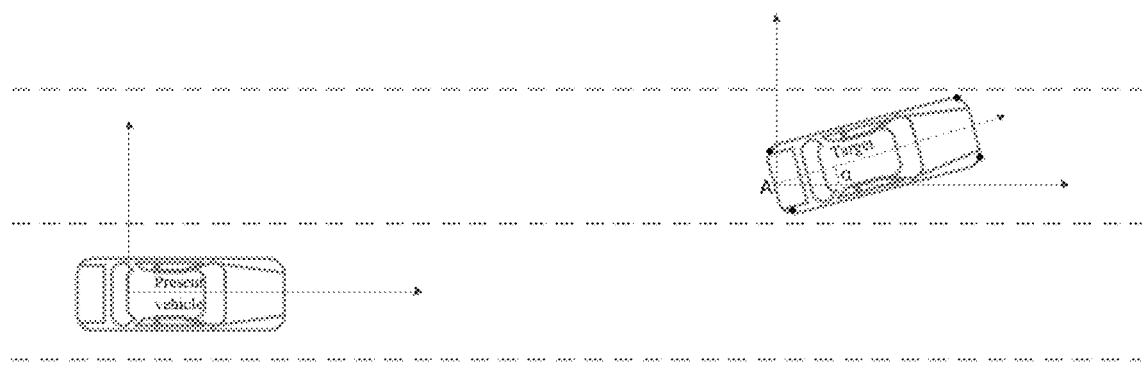
FIG. 2 shows a relative schematic diagram of a present vehicle and an environmental target.

FIG. 2 shows a relative schematic diagram of a present vehicle and an environmental target. As shown in FIG. 2, the environmental target is a vehicle, and the environmental target is in a left lane of a lane where the present vehicle is traveling. Sensor(s) on the present vehicle may detect the position of a rear-end center point A of the environmental target, an included angle between a center line of the environmental target and a lateral or longitudinal axis of the present vehicle, a length of the environmental target, and a width of the environmental target. Output information of the sensor(s) on the present vehicle is provided usually based on a vehicle coordinate system with reference to the present vehicle. In the vehicle coordinate system $X_H O_H Y_H$, a center point of the vehicle is usually selected as origin point $O_H$, $X_H$ points to a longitudinal axis direction of the vehicle, $Y_H$ points to a lateral axis direction of the vehicle. The vehicle coordinate system $X_H O_H Y_H$ follows the right-hand rule, with counterclockwise referring to positive. The position of the rear-end center point A is the coordinate of the rear-end center point A in the vehicle coordinate system. If a vehicle sensor outputs an included angle α between the center line of the environmental target and the longitudinal axis (i.e. axis $X_H$) of the present vehicle, position coordinates of each corner point of the environmental target in the vehicle coordinate system may be calculated by using the coordinates of the rear-end center point A of the environmental target in the vehicle coordinate system, the included angle α between the center line of the environmental target and the longitudinal axis of the present vehicle, the length of the environmental target, and the width of the environmental target.

In other words, in the above step S110, position coordinates of each corner point of the environmental target in the vehicle coordinate system may be acquired. Since the vehicle coordinate system and a global coordinate system may be converted to each other, the acquired position coordinates of each corner point of the environmental target in the vehicle coordinate system may also be converted to position coordinates in the global coordinate system. In the above step S110, position coordinates of each corner point of the environmental target in the global coordinate system may be acquired, which is not specifically limited in the embodiment of the present invention.

Figure 3:
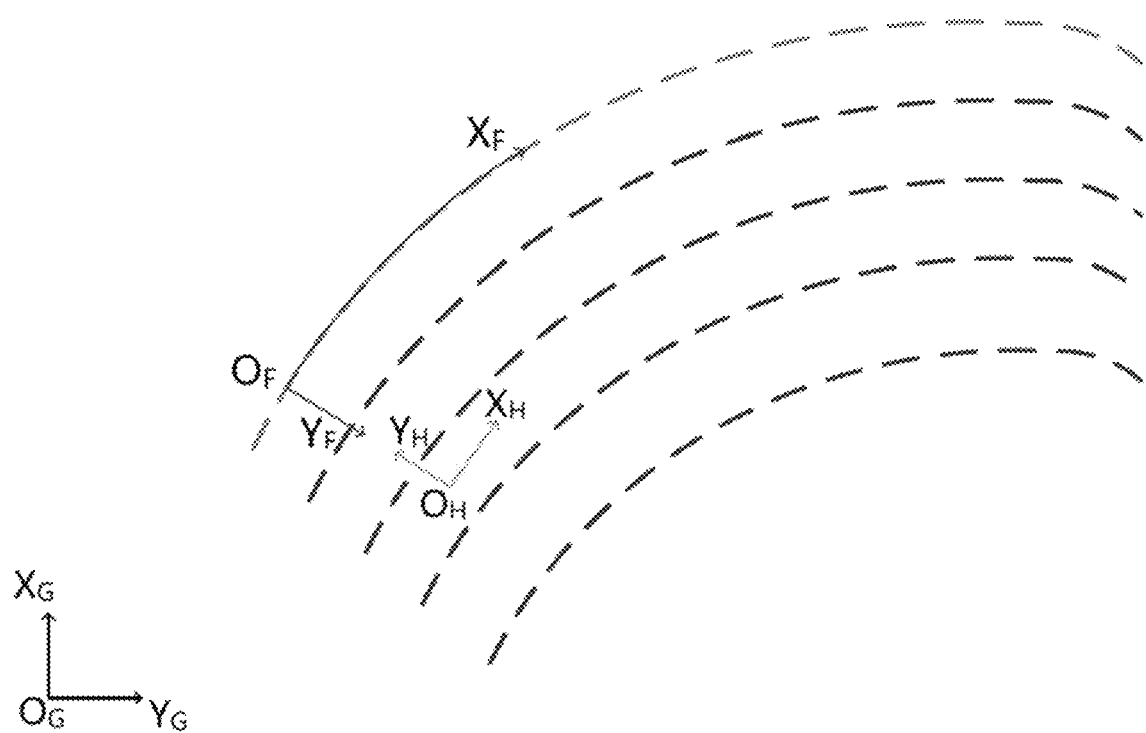
FIG. 3 shows a schematic diagram of a traveling coordinate system.

A traveling coordinate system mentioned in the embodiment of the present invention will be first introduced below in conjunction with FIGS. 3 and 4. FIG. 3 shows a schematic diagram of a traveling coordinate system. In FIG. 3, $X_F O_F Y_F$ represents the traveling coordinate system, $X_H O_H Y_H$ is the vehicle coordinate system, and $X_G O_G Y_G$ is the global coordinate system. The global coordinate system $X_G O_G Y_G$ is based on a geodetic coordinate system, wherein $X_G$ points to north, $Y_G$ points to east, a clockwise angle direction is positive, with angles in a range of [0, 360°], and lane line information in a map is usually provided based on the global coordinate system. The vehicle coordinate system $X_H O_H Y_H$ is based on the present vehicle, wherein the center point of the vehicle is usually selected as a coordinate origin $O_H$, $X_H$ points to the longitudinal axis direction of the vehicle, $Y_H$ points to the lateral axis direction of the vehicle, and the vehicle coordinate system $X_H O_H Y_H$ follows the right-hand rule, with counterclockwise referring to positive. The output information of the sensor(s) such as camera(s), lidar(s) or millimeter-wave radar(s) on the vehicle is usually provided based on the vehicle coordinate system. The traveling coordinate system $X_F O_F Y_F$ proposed in the embodiment of the present invention uses a sideline of a road as reference line, and the sideline of the road may be a leftmost lane sideline or a rightmost lane sideline of a road where the vehicle is located; a coordinate origin $O_F$ is a point on the reference line at the shortest distance to a fourth feature point of the vehicle; a lateral axis $X_F$ may be parallel to a guide line direction of the road, for example, the lateral axis $X_F$ may point to the guide line direction of the road or may be opposite to the guide line direction of the road. A longitudinal axis $Y_F$ and the guide line direction of the road follow a left-hand or right-hand rule. Here, the fourth feature point may be any point on the vehicle, for example, the fourth feature point may be the center point of the vehicle, that is, the fourth feature point may coincide with the origin of the vehicle coordinate system.

In the case where the road is straight, the lateral axis $X_F$ is parallel to the direction of a straight guide line of the road. In the case where the road inflects, for example, the vehicle takes the turning, the lateral axis $X_F$ is parallel to the direction of a curved guide line of the road, i.e., the lateral axis $X_F$ is always consistent with the guide line of the road in direction. FIG. 3 shows a schematic diagram in which the longitudinal axis $Y_F$ and the guide line direction of the road follow the left-hand rule. The embodiment of the present invention is also described mainly by using an example in which the longitudinal axis $Y_F$ and the guide line direction of the road follow the left-hand rule. A situation in which the longitudinal axis $Y_F$ and the guide line direction of the road follow the right-hand rule is similar to the example, and will not be described in detail herein. Lane lines and the environmental target may have dual attributes of the vehicle coordinate system and the traveling coordinate system at the same time.

Figure 4:
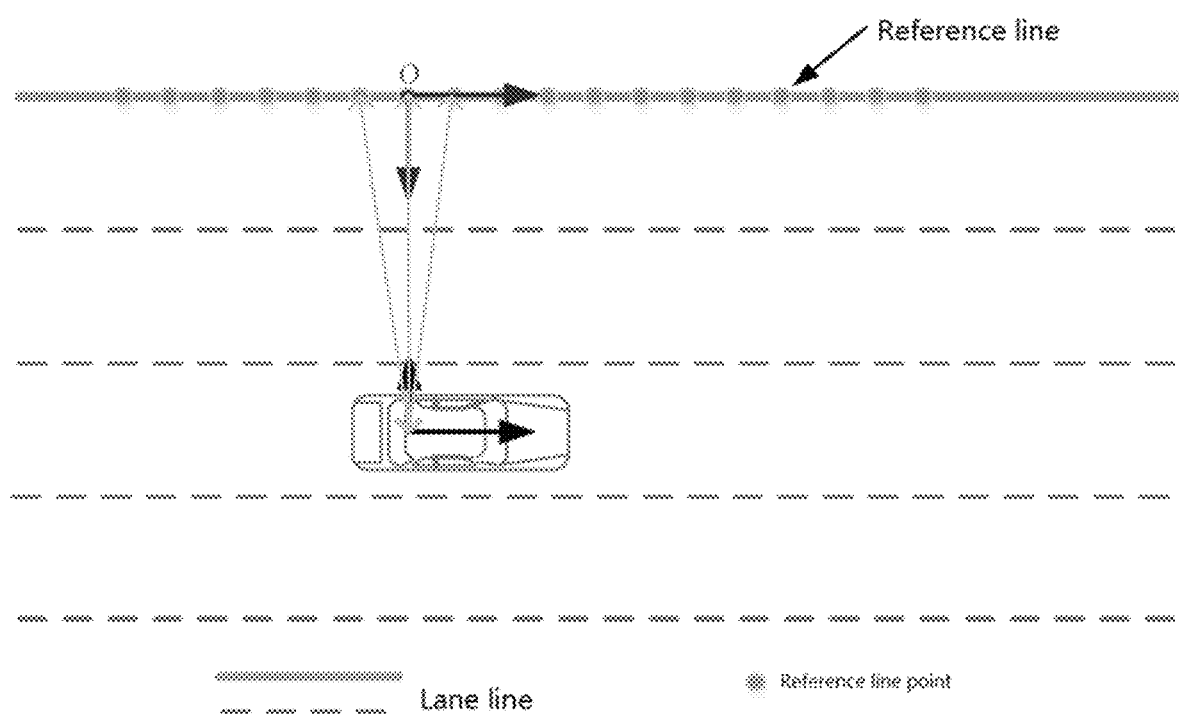
FIG. 4 shows a schematic diagram of determining an origin of the traveling coordinate system.

FIG. 4 shows a schematic diagram of determining the origin of the traveling coordinate system. A leftmost lane line of a road where the vehicle is located in FIG. 4 is determined as a reference line. The reference line of the traveling coordinate system $X_F O_F Y_F$ is divided by multiple points (reference line points shown in FIG. 4), and every two adjacent points may be spaced from each other by a same predetermined distance, which may set optionally as needed, for example, the predetermined distance may range from 0.05 m to 0.3 m. A shortest distance from a point on the reference line to the center point of the vehicle is sought in the vehicle coordinate system. For example, a Euclidean distance between each divided point or each point in a predetermined range on the reference line and the center of the vehicle is calculated to find the shortest distance from the reference line to the center of the vehicle. A point, corresponding to the shortest distance, on the reference line is used as the origin $O_F$ of the traveling coordinate system. As the vehicle moves, the position of the origin $O_F$ of the traveling coordinate system also changes constantly.

One or more feature points of the environmental target in the embodiment of the present invention are described mainly with respect to the traveling coordinate system. The one or more feature points of the environmental target may include feature point of a fixed area and/or a feature point of a follow-up area.

The one or more feature points of the fixed area may include one or more of: a laterally closest point of the fixed area, which is a point, being laterally closest to the reference line of the traveling coordinate system $X_F O_F Y_F$, on the environmental target; a laterally farthest point of the fixed area, which is a point, being laterally farthest from the reference line of the traveling coordinate system $X_F O_F Y_F$, on the environmental target; a longitudinally closest point of the fixed area, which is a point, being longitudinally closest to the coordinate origin $O_F$ of the traveling coordinate system $X_F O_F Y_F$, on the environmental target; a 3.75 feature point of the fixed area, which is a point, being longitudinally closest to the coordinate origin $O_F$, of intersection points between the environmental target and lane lines on both sides of a lane where the present vehicle is located; and a 2.8 feature point of the fixed area, which is a point, being longitudinally closest to the coordinate origin $O_F$, of intersection points between the environmental target and two virtual lines in a lane where the present vehicle is located, wherein the two virtual lines are parallel to the lane lines on both sides of the lane where the vehicle is located, and are spaced from the corresponding one of the lane lines on both sides by a predetermined lateral distance, respectively.

In the case where the environmental target is a vehicle, the environmental target has four corner points. The laterally closest point of the fixed area, the laterally farthest point of the fixed area, and the longitudinally closest point of the fixed area may be selected from the four corner points of the environmental target according to the definition of the feature points, wherein the longitudinally closest point of the fixed area is a feature point closest to the vehicle, and is also a feature point concerned by an autonomous vehicle; and especially, when a target vehicle is located in an area directly in front of the present vehicle, a decision-making system may control the speed, accelerated speed, traveling lane and the like of the present vehicle by the assistance of acquisition of the closest points of the fixed area.

Figure 5:
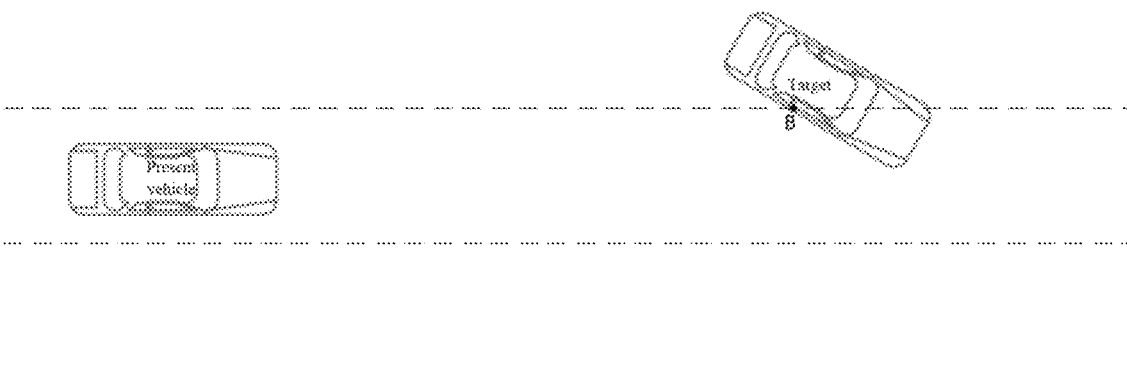
FIG. 5 shows a schematic diagram of a 3.75 feature point of a fixed area.

FIG. 5 shows a schematic diagram of the 3.75 feature point of the fixed area. As shown in FIG. 5, the 3.75 feature point of the fixed area is a point B, being longitudinally closest to the coordinate origin $O_F$, of intersection points between the environmental target and lane lines on both sides of the lane where the present vehicle is located. Optionally, all intersection points respectively between each line segment formed by every two adjacent corner points of the environmental target and the lane lines on both sides of the lane where the present vehicle is located may be calculated in the vehicle coordinate system or the global coordinate system. For example, a line segment equation and a lane line equation may be simultaneous in the vehicle coordinate system, and coordinates of the intersection points are obtained by solving the simultaneous equations. Then, the point B longitudinally closest to the coordinate origin $O_F$ of the vehicle coordinate system $X_F O_F Y_F$ is selected from all the intersection points to be taken as the 3.75 feature point of the fixed area.

Figure 6:
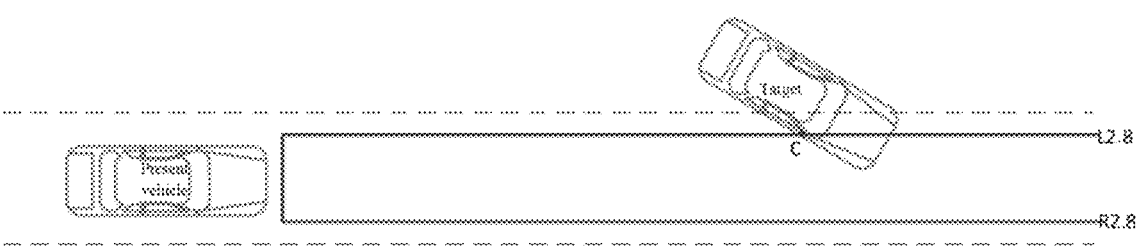
FIG. 6 shows a schematic diagram of a 2.8 feature point of the fixed area.

FIG. 6 shows a schematic diagram of the 2.8 feature point of the fixed area. As shown in FIG. 6, the 2.8 feature point of the fixed area is a point C, being longitudinally closest to the coordinate origin $O_F$ of the vehicle coordinate system $X_F O_F Y_F$, of intersection points between the environmental target and two virtual lines L2.8 and R2.8 in the lane where the present vehicle is located. The virtual line L2.8 is parallel to the lane lines on both sides of the lane where the present vehicle is located, and is spaced from the lane line on the left side of the lane where the vehicle is located by a predetermined lateral distance. The virtual line R2.8 is parallel to the lane lines on both sides of the lane where the present vehicle is located, and is spaced from the lane line on the right side of the lane where the present vehicle is located by a predetermined lateral distance. The predetermined lateral distance may range from 0.445 m to 0.505 m. For example, the predetermined distance may be 0.475 m. Generally, a width of the lane is 3.75 m, and if the predetermined distance is 0.475 m, a width between the two virtual lines L2.8 and R2.8 is 2.8 m. Optionally, all intersection points respectively between each line segment formed by every two adjacent corner points of the environmental target and the two virtual lines L2.8 and R2.8 may be calculated in the vehicle coordinate system or the global coordinate system. For example, a line segment equation and a virtual line equation may be simultaneous in the vehicle coordinate system, and coordinates of the intersection points are obtained by solving the simultaneous equations. Then, the point C longitudinally closest to the coordinate origin $O_F$ of the vehicle coordinate system $X_F O_F Y_F$ is selected from all the intersection points to be taken as the 2.8 feature point of the fixed area.

In some situations, the feature points of the target vehicle may only include the laterally closest point of the fixed area, the laterally farthest point of the fixed area, and the longitudinally closest point of the fixed area, but does not include the 3.75 feature point of the fixed area and/or the 2.8 feature point of the fixed area. If calculation shows that the target vehicle has the 3.75 feature point of the fixed area and/or the 2.8 feature point of the fixed area, it indicates that part of the target vehicle is located in an area in front of the lane where the present vehicle is located, and the decision-making system may take into account the location of the 3.75 feature point of the fixed area and/or the location of the 2.8 feature point of the fixed area in a lane change decision to arrive at a more accurate and safer lane change solution. In addition, based on the solving of the feature points, i.e., the 3.75 feature point of the fixed area and the 2.8 feature point of the fixed area, the decision-making system may determine an importance level of the target more easily, making the entire system safer and more stable.

Figure 7:
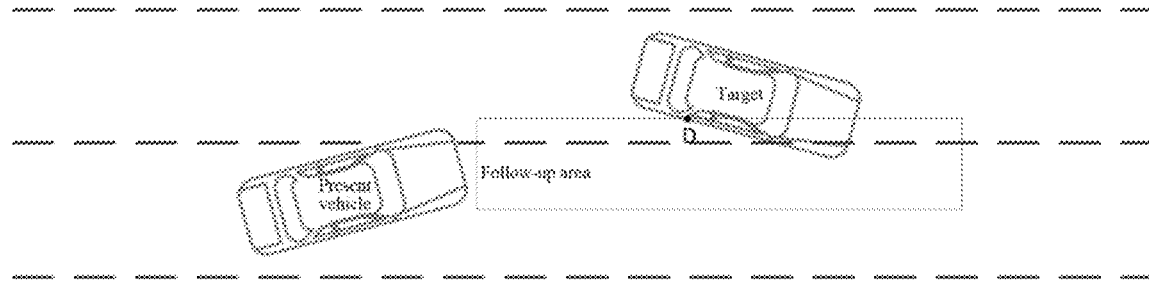
FIG. 7 shows a schematic diagram of a feature point of a follow-up area.

FIG. 7 shows a schematic diagram of a feature point of a follow-up area. As shown in FIG. 7, the follow-up area is an area that is located in front of (such as directly in front of) of a vehicle in a traveling direction and parallel to a road direction and has a predetermined width. An extension line of a center line of the follow-up area may pass through a front-end center point of the present vehicle. FIG. 7 shows a schematic diagram of a follow-up area on a straight road. In a working condition of a curve, the follow-up area parallel to the road direction is also curved. Two virtual follow-up area lines FL2.8 and FR2.8 of the follow-up area may be obtained by offsetting a virtual line passing through the front-end center point of the present vehicle and parallel to the lane lines by a predetermined distance to the left and right, respectively, and the predetermined distance may range from 1.1 m to 1.7 m, for example, may be 1.4 m. A length range of the follow-up area may be from 150 m to 250 m, and/or a width range of the follow-up area may be from 2.2 m to 3.4 m. The width range of the follow-up area may preferably be greater than or equal to the width of the vehicle. The follow-up area moves with the movement of the vehicle, but is always located in front of the vehicle. For example, during lateral lane change of the vehicle, the follow-up area is still located in front of the vehicle in the traveling direction.

The feature point of the follow-up area refers to a point D, being longitudinally closest to the coordinate origin $O_F$ of the traveling coordinate system $X_F O_F Y_F$, of intersection points between the environmental target and the follow-up area. Optionally, all intersection points respectively between each line segment formed by every two adjacent corner points of the environmental target and the two virtual lines FL2.8 and FR2.8 may be calculated in the vehicle coordinate system or the global coordinate system. For example, a line segment equation and a virtual line equation may be simultaneous in the vehicle coordinate system, and coordinates of the intersection points are obtained by solving the simultaneous equations. Then, the point D longitudinally closest to the coordinate origin $O_F$ of the vehicle coordinate system $X_F O_F Y_F$ is selected from all the intersection points to be taken as the feature point of the follow-up area.

If calculation shows that the target vehicle has a feature point of the follow-up area, it may be determined that at least part of the target vehicle is located in the follow-up area, and during lane change of the vehicle, the speed, accelerated speed and the like of the lane change should be adjusted in real time according to the position of the feature point of the follow-up area.

Further, the method for extracting the feature points of the environmental target provided in the embodiment of the present invention may further include acquiring coordinates of each feature point of the environmental target in the traveling coordinate system.

Figure 8:
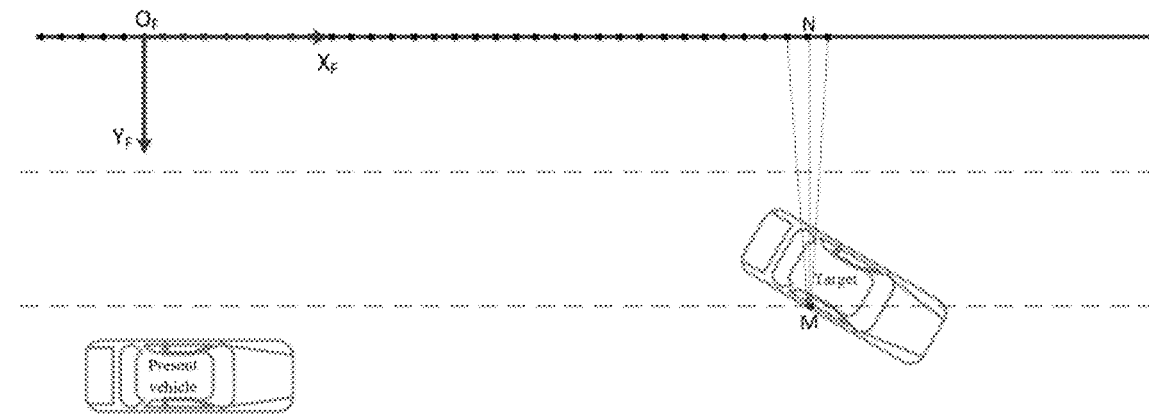
FIG. 8 shows a schematic diagram of calculating coordinates of any feature point of the environmental target in the traveling coordinate system.

FIG. 8 shows a schematic diagram of calculating coordinates of any feature point of the environmental target in the traveling coordinate system. FIG. 8 is described by using an example in which the lateral axis $X_F$ of the traveling coordinate system points to the guide line direction of the road, and the longitudinal axis $Y_F$ and the guide line direction of the road follow the left-hand rule. Coordinates of any feature point M on the environmental target in the vehicle coordinate system is known by calculation.

The shortest distance from the reference line to the point M is sought in the traveling coordinate system. For example, forward or backward traversal may be performed from the origin of the traveling coordinate system on the reference line, wherein whether forward or backward traversal is performed depends on whether the point M is in front of or behind the center point of the vehicle, which may be simply determined according to the coordinates of the point M in the vehicle coordinate system. If the point M is in front of the center point of the present vehicle, points on the reference line are traversed forward from the origin of the traveling coordinate system on the reference line, to determine the shortest distance to the point M, and a point N corresponding to the shortest distance on the reference line. If the point M is behind the center point of the vehicle, the points on the reference line are traversed backward from the origin of the traveling coordinate system on the reference line, to determine the shortest distance to the point M, and a point N corresponding to the shortest distance on the reference line. The numerical value of the shortest distance may be used as the numerical value of an ordinate of the point M in the traveling coordinate system. Whether the ordinate of the point M in the traveling coordinate system is positive or negative may be determined according to the position of the point M relative to the reference line or the coordinate origin $O_F$. If the point M is on the right side of the reference line or the coordinate origin $O_F$, the ordinate is positive, and if the point M is on the left side of the reference line or the coordinate origin $O_F$, the ordinate is negative.

The numerical value of an abscissa of the point M in the traveling coordinate system is the numerical value of a longitudinal arc length between the point N on the reference line and the coordinate origin $O_F$, and the numerical value of the longitudinal arc length between the point N on the reference line and the coordinate origin $O_F$ may be calculated by accumulation of distances between divided points between the point N on the reference line and the coordinate origin $O_F$. Whether the abscissa of the point M in the traveling coordinate system is positive or negative may be determined according to the position of the point M relative to the coordinate origin $O_F$. If the point M is in front of the coordinate origin $O_F$, the ordinate is positive, and if the point is behind the coordinate origin $O_F$, the ordinate is negative.

The determination of the coordinates of any feature point of the environmental target in the traveling coordinate system is similar to the determination of the coordinates of the point M in the traveling coordinate system, and will not be described in detail herein.

By calculating the coordinates of each feature point in the traveling coordinate system, the use range of target feature point information is expanded, so that the target feature point information may be used in both a straight road condition and a curved road condition. The distance calculated in the traveling coordinate system is an arc length rather than a straight-line distance in the curved road condition, which improves the accuracy of the feature point distance information of the environmental target in a special condition.

Correspondingly, an embodiment of the present invention further provides a machine-readable storage medium that stores instructions which are configured to enable a machine to execute the above-mentioned method for extracting the feature point of the environmental target. The machine-readable storage medium may be, for example, a USB flash disk, a mobile hard disk, a read-only memory (ROM), a random access memory (RAM), a magnetic disk, an optical disk or any of other various media that can store program codes.

Figure 9:
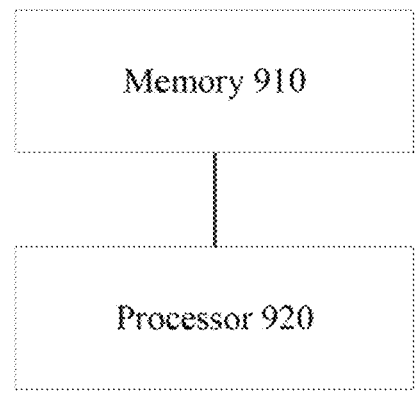
FIG. 9 shows a structural block diagram of an apparatus for extracting feature point of environmental target according to an embodiment of the present invention.

FIG. 9 shows a structural block diagram of an apparatus for extracting feature point of an environmental target according to an embodiment of the present invention. As shown in FIG. 9, an embodiment of the present invention further provides an apparatus for extracting feature point of an environmental target. The apparatus may include a memory 910 and a processor 920. The memory 910 may store instructions which enable the processor to 920 to execute a method for extracting the feature point of the environmental target according to any embodiment of the present invention.

The processor 920 may be a central processing unit (CPU), and may also be other general-purpose processor, a digital signal processor (DSP), an application specific integrated circuit (ASIC), a field-programmable gate array (FPGA) or other programmable logic device, a discrete gate or transistor logic device, a discrete hardware component or the like.

The memory 910 may be configured to store computer program instructions, and the processor implements the various functions of an apparatus for extracting feature point of an environmental target by running or executing the computer program instructions stored in the memory and calling data stored in the memory. The memory 910 may include a high-speed random access memory, and may also include a non-volatile memory, such as a hard disk, an internal memory, a plug-in hard disk, a smart media card (SMC), a secure digital (SD) card, a flash card, at least one magnetic disk storage device, a flash memory device, or other volatile solid-state memory device.

Specific working principles and benefits of the apparatus for the extracting feature point of the environmental target provided in the embodiment of the present invention are similar to specific working principles and benefits of the method for extracting the feature point of the environmental target provided in the above embodiment of the present invention, and will not be described in detail herein.

Optional implementations of the embodiments of the present invention are described above in detail in conjunction with the accompanying drawings. However, the embodiments of the present invention are not limited to the specific details in the above implementations. Within the scope of the technical concept of the embodiments of the present invention, various simple modifications may be made to the technical solutions of the embodiments of the present invention, and these simple modifications are all encompassed within the protection scope of the embodiments of the present invention.

In addition, it should be noted that the various specific technical features described in the above specific implementations may be combined in any suitable manner without contradiction. To avoid unnecessary repetition, various possible combinations will not be described separately in the embodiments of the present invention.

Those skilled in the art may understand that all or part of the steps in the method of the above embodiments may be implemented by relevant hardware instructed by a program, and the program is stored in a storage medium, and includes a number of instructions configured to enable a single-chip microcomputer, chip or processor to execute all or part of the steps in the method of the various embodiments of the present application. The above-mentioned storage medium includes: a USB flash disk, a mobile hard disk, an ROM, an RAM, a magnetic disk, an optical disk or any of other various media that can store program codes.

In addition, various different implementations of the embodiments of the present invention may also be combined optionally, and the combinations should also be regarded as contents disclosed in the embodiments of the present invention so long as they do not depart from the idea of the present invention.

The invention claimed is:

1. A method for extracting feature point of an environmental target, comprising:
acquiring a position of each corner point of the environmental target; and
determining one or more feature points of the environmental target according to the position of each corner point of the environmental target.

2. The method according to claim 1, wherein
the feature point of the environmental target comprise feature point of a fixed area and/or a feature point of a follow-up area;
wherein the one or more feature points of the fixed area comprises one or more of: a laterally closest point of the fixed area, which is a point, being laterally closest to a reference line of a traveling coordinate system $X_F O_F Y_F$, on the environmental target; a laterally farthest point of the fixed area, which is a point, being laterally farthest from the reference line, on the environmental target; a longitudinally closest point of the fixed area, which is a point, being longitudinally closest to a coordinate origin $O_F$ of the traveling coordinate system $X_F O_F Y_F$, on the environmental target; a 3.75 feature point of the fixed area, which is a point, being longitudinally closest to the coordinate origin $O_F$, of intersection points between the environmental target and lane lines on both sides of a lane where a present vehicle is located; and a 2.8 feature point of the fixed area, which is a point, being longitudinally closest to the coordinate origin $O_F$, of intersection points between the environmental target and two virtual lines in the lane where the present vehicle is located, wherein the two virtual lines are parallel to the lane lines on both sides of the lane where the present vehicle is located, and are spaced from one of the lane lines on both sides by a predetermined lateral distance, respectively;
wherein the follow-up area is located in front of the present vehicle in a traveling direction and is parallel to a road direction and has a predetermined width, and the feature point of the follow-up area refers to a point longitudinally closest to the coordinate origin $O_F$, of intersection points between the environmental target and the follow-up area; and
wherein in the traveling coordinate system $X_F O_F Y_F$, a sideline of a road where the present vehicle is located is used as the reference line, the coordinate origin $O_F$ is a point on the reference line at the shortest distance to a feature point of the present vehicle, a lateral axis $X_F$ is parallel to a guide line direction of the road, and a longitudinal axis $Y_F$ and the guide line direction of the road follow a left-hand or right-hand rule.

3. The method according to claim 1, wherein determining the one or more feature points of the environmental target according to the position of each corner point of the environmental target comprises:
selecting the laterally closest point of the fixed area, the laterally farthest point of the fixed area, and the longitudinally closest point of the fixed area from the corner points of the environmental target;
calculating intersection points respectively between each line segment formed by every two adjacent corner points of the environmental target and the lane lines on both sides of the lane where the present vehicle is located, and using a point, being longitudinally closest to the coordinate origin $O_F$, of the intersection points as the 3.75 feature point of the fixed area;
calculating intersection points respectively between each line segment formed by connecting every two adjacent corner points of the environmental target and the two virtual lines, and using a point, being longitudinally closest to the coordinate origin $O_F$, of the intersection points as the 2.8 feature point of the fixed area; and
calculating intersection points respectively between each line segment formed by connecting every two adjacent corner points of the environmental target and the follow-up area, and using a point, being longitudinally closest to the coordinate origin $O_F$, of the intersection points as the feature point of the follow-up area.

4. The method according to claim 1, further comprising:
acquiring coordinates of each feature point of the environmental target in the traveling coordinate system.

5. The method according to claim 4, wherein the coordinates of any feature point of the environmental target in the traveling coordinate system are determined according to the following steps:
determining a shortest distance from the reference line to the any feature point, and a point, corresponding to the shortest distance, on the reference line;
using a numerical value of the shortest distance as a numerical value of an ordinate of the any feature point in the traveling coordinate system;
determining a longitudinal arc length between the point on the reference line at the shortest distance to the any feature point and the coordinate origin $O_F$; and
using a numerical value of the longitudinal arc length as a numerical value of an abscissa of the any feature point in the traveling coordinate system,
wherein whether the ordinate and the abscissa of the any feature point are positive or negative is determined according to the position of the feature point relative to the coordinate origin $O_F$ in the traveling coordinate system.

6. The method according to claim 2, wherein an extension line of a center line of the follow-up area passes through a front-end center point of the present vehicle; a length of the follow-up area ranges from 150 m to 250 m; and/or a width of the follow-up area ranges from 2.2 m to 3.4 m.

7. The method according to claim 2, wherein the predetermined lateral distance ranges from 0.445 m to 0.505 m.

8. The method according to claim 1, wherein acquiring the position of each corner point of the environmental target comprises:
acquiring position of a rear-end center point of the environmental target, an included angle between a center line of the environmental target and a lateral or longitudinal axis of the present vehicle, a length of the environmental target, and a width of the environmental target; and calculating the position of each corner point of the environmental target by using the position of the rear-end center point, the included angle, the length of the environmental target, and the width of the environmental target.

9. An apparatus for extracting feature point of environmental target comprising a memory and a processor, wherein the memory stores instructions which are configured to enable the processor to execute the following steps:

acquiring a position of each corner point of the environmental target; and determining one or more feature points of the environmental target according to the position of each corner point of the environmental target.

10. A machine-readable storage medium, storing instructions which are configured to enable a machine to execute the method for extracting the feature point of the environmental target according to claim 1.

11. The method according to claim 2, wherein determining the one or more feature points of the environmental target according to the position of each corner point of the environmental target comprises:

selecting the laterally closest point of the fixed area, the laterally farthest point of the fixed area, and the longitudinally closest point of the fixed area from the corner points of the environmental target;

calculating intersection points respectively between each line segment formed by every two adjacent corner points of the environmental target and the lane lines on both sides of the lane where the present vehicle is located, and using a point, being longitudinally closest to the coordinate origin $O_F$, of the intersection points as the 3.75 feature point of the fixed area;

calculating intersection points respectively between each line segment formed by connecting every two adjacent corner points of the environmental target and the two virtual lines, and using a point, being longitudinally closest to the coordinate origin $O_F$, of the intersection points as the 2.8 feature point of the fixed area; and calculating intersection points respectively between each line segment formed by connecting every two adjacent corner points of the environmental target and the follow-up area, and using a point, being longitudinally closest to the coordinate origin $O_F$, of the intersection points as the feature point of the follow-up area.

12. The method according to claim 2, further comprising:

acquiring coordinates of each feature point of the environmental target in the traveling coordinate system.

13. The apparatus according to claim 9, wherein the feature point of the environmental target comprise feature point of a fixed area and/or a feature point of a follow-up area;

wherein the one or more feature points of the fixed area comprises one or more of: a laterally closest point of the fixed area, which is a point, being laterally closest to a reference line of a traveling coordinate system $X_F O_F Y_F$, on the environmental target; a laterally farthest point of the fixed area, which is a point, being laterally farthest from the reference line, on the environmental target; a longitudinally closest point of the fixed area, which is a point, being longitudinally closest to a coordinate origin $O_F$ of the traveling coordinate system $X_F O_F Y_F$, on the environmental target; a 3.75 feature point of the fixed area, which is a point, being longitudinally closest to the coordinate origin $O_F$, of intersection points between the environmental target and lane lines on both sides of a lane where a present vehicle is located; and a 2.8 feature point of the fixed area, which is a point, being longitudinally closest to the coordinate origin $O_F$, of intersection points between the environmental target and two virtual lines in the lane where the present vehicle is located, wherein the two virtual lines are parallel to the lane lines on both sides of the lane where the present vehicle is located, and are spaced from one of the lane lines on both sides by a predetermined lateral distance, respectively;

wherein the follow-up area is located in front of the present vehicle in a traveling direction and is parallel to a road direction and has a predetermined width, and the feature point of the follow-up area refers to a point longitudinally closest to the coordinate origin $O_F$, of intersection points between the environmental target and the follow-up area; and wherein in the traveling coordinate system $X_F O_F Y_F$, a sideline of a road where the present vehicle is located is used as the reference line, the coordinate origin $O_F$ is a point on the reference line at the shortest distance to a feature point of the present vehicle, a lateral axis $X_F$ is parallel to a guide line direction of the road, and a longitudinal axis $Y_F$ and the guide line direction of the road follow a left-hand or right-hand rule.

14. The apparatus according to claim 9, wherein determining the one or more feature points of the environmental target according to the position of each corner point of the environmental target comprises:

selecting the laterally closest point of the fixed area, the laterally farthest point of the fixed area, and the longitudinally closest point of the fixed area from the corner points of the environmental target;

calculating intersection points respectively between each line segment formed by every two adjacent corner points of the environmental target and the lane lines on both sides of the lane where the present vehicle is located, and using a point, being longitudinally closest to the coordinate origin $O_F$, of the intersection points as the 3.75 feature point of the fixed area;

calculating intersection points respectively between each line segment formed by connecting every two adjacent corner points of the environmental target and the two virtual lines, and using a point, being longitudinally closest to the coordinate origin $O_F$, of the intersection points as the 2.8 feature point of the fixed area; and calculating intersection points respectively between each line segment formed by connecting every two adjacent corner points of the environmental target and the follow-up area, and using a point, being longitudinally closest to the coordinate origin $O_F$, of the intersection points as the feature point of the follow-up area.

15. The apparatus according to claim 13, wherein determining the one or more feature points of the environmental target according to the position of each corner point of the environmental target comprises:

selecting the laterally closest point of the fixed area, the laterally farthest point of the fixed area, and the longitudinally closest point of the fixed area from the corner points of the environmental target;

calculating intersection points respectively between each line segment formed by every two adjacent corner points of the environmental target and the lane lines on both sides of the lane where the present vehicle is located, and using a point, being longitudinally closest to the coordinate origin $O_F$, of the intersection points as the 3.75 feature point of the fixed area;

calculating intersection points respectively between each line segment formed by connecting every two adjacent corner points of the environmental target and the two virtual lines, and using a point, being longitudinally closest to the coordinate origin $O_F$, of the intersection points as the 2.8 feature point of the fixed area; and calculating intersection points respectively between each line segment formed by connecting every two adjacent corner points of the environmental target and the follow-up area, and using a point, being longitudinally closest to the coordinate origin $O_F$, of the intersection points as the feature point of the follow-up area.

16. The apparatus according to claim 9, the instructions further configured to enable the processor to execute the following step:

acquiring coordinates of each feature point of the environmental target in the traveling coordinate system.

17. The apparatus according to claim 16, wherein the coordinates of any feature point of the environmental target in the traveling coordinate system are determined according to the following steps:

determining a shortest distance from the reference line to the any feature point, and a point, corresponding to the shortest distance, on the reference line;

using a numerical value of the shortest distance as a numerical value of an ordinate of the any feature point in the traveling coordinate system;

determining a longitudinal arc length between the point on the reference line at the shortest distance to the any feature point and the coordinate origin $O_F$; and using a numerical value of the longitudinal arc length as a numerical value of an abscissa of the any feature point in the traveling coordinate system, wherein whether the ordinate and the abscissa of the any feature point are positive or negative is determined according to the position of the feature point relative to the coordinate origin $O_F$ in the traveling coordinate system.

18. The apparatus according to claim 13, wherein an extension line of a center line of the follow-up area passes through a front-end center point of the present vehicle; a length of the follow-up area ranges from 150 m to 250 m; and/or a width of the follow-up area ranges from 2.2 m to 3.4 m.

19. The apparatus according to claim 13, wherein the predetermined lateral distance ranges from 0.445 m to 0.505 m.

20. The apparatus according to claim 13, wherein acquiring the position of each corner point of the environmental target comprises:

acquiring position of a rear-end center point of the environmental target, an included angle between a center line of the environmental target and a lateral or longitudinal axis of the present vehicle, a length of the environmental target, and a width of the environmental target; and calculating the position of each corner point of the environmental target by using the position of the rear-end center point, the included angle, the length of the environmental target, and the width of the environmental target.

* * * * *